Oct. 1, 1929.  R. B. WASSON  1,729,732
METHOD AND APPARATUS FOR TESTING RINGS AND ENGINES
Filed Dec. 19, 1923  2 Sheets-Sheet 1
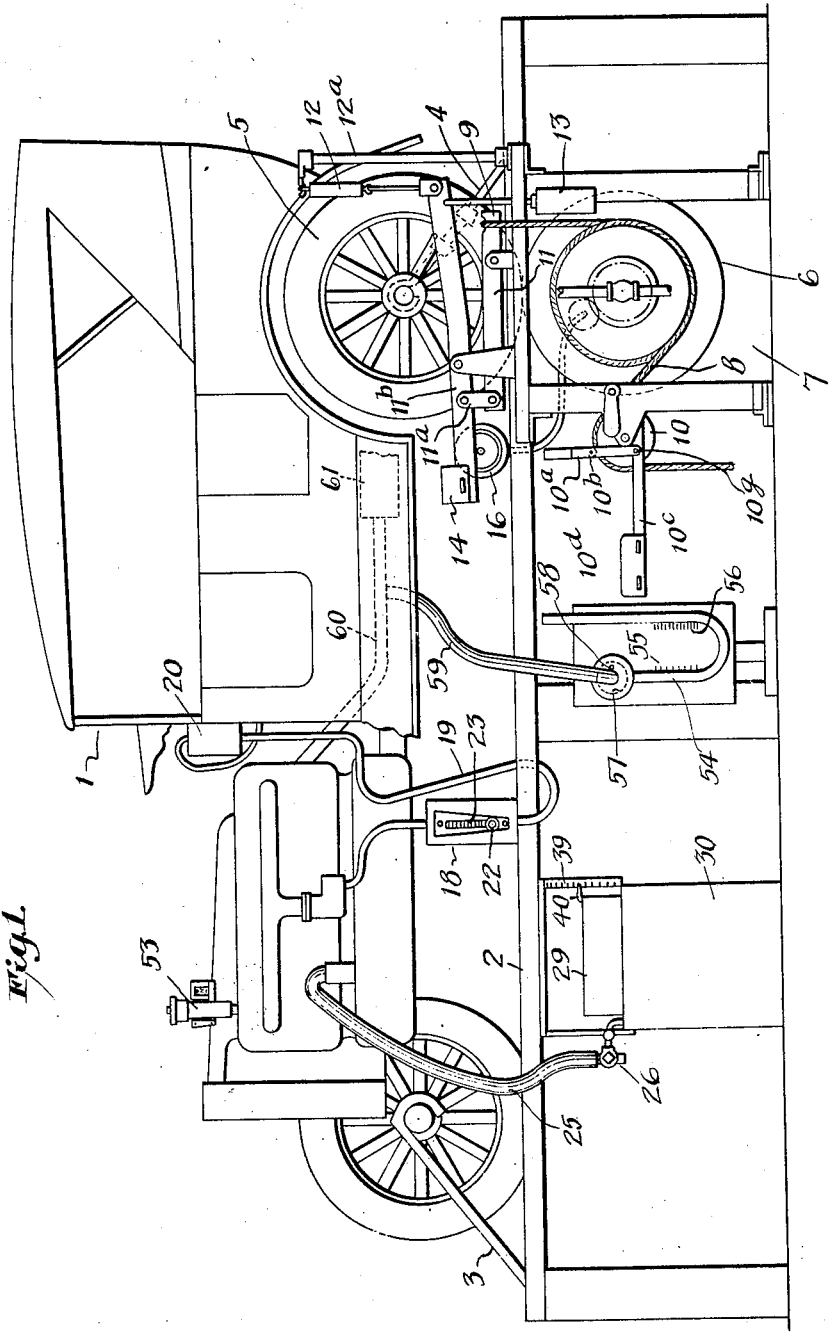
INVENTOR
Robert B. Wasson
BY
ATTORNEY Oct. 1, 1929.  R. B. WASSON  1,729,732
METHOD AND APPARATUS FOR TESTING RINGS AND ENGINES
Filed Dec. 19, 1923  2 Sheets-Sheet 2
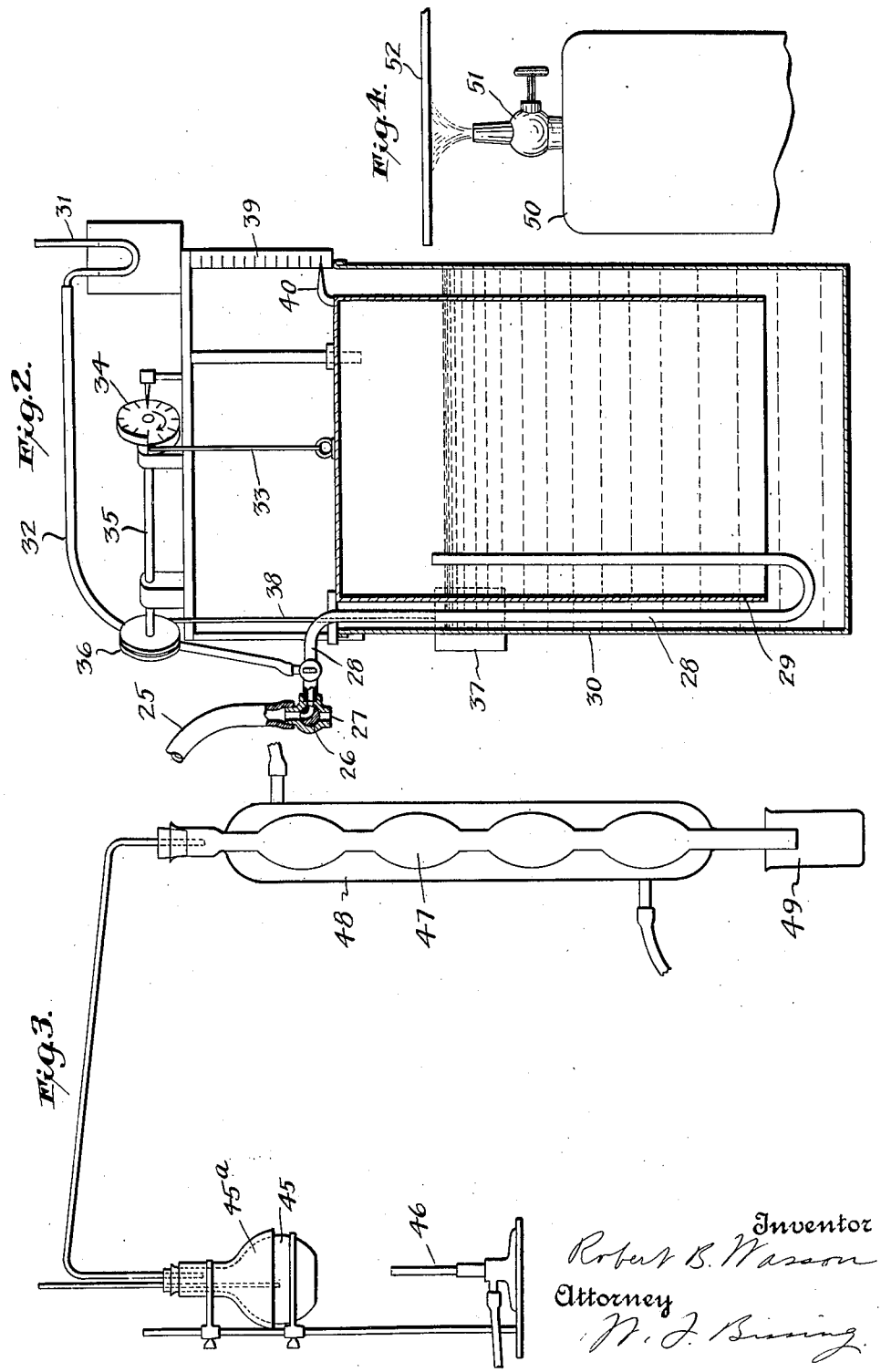

Patented Oct. 1, 1929

1,729,732

UNITED STATES PATENT OFFICE

ROBERT B. WASSON, OF CRANFORD, NEW JERSEY

METHOD AND APPARATUS FOR TESTING RINGS AND ENGINES

Application filed December 19, 1923. Serial No. 681,454.

My invention relates to a method and apparatus for testing the sealing properties of piston rings in internal combustion engines and the factors which enter into the overall efficiency of the engine. By a series of steps, the results of which are indicated by apparatus to be hereafter described and a few tests by observation, a quick comprehensive and correct survey can be made of the condition of any type of engine and its relation to the sealing value of the rings used.

One of the objects of the invention is to determine the relation between the overall efficiency or performance of the motor and of each of the factors which control it, with special relation to piston ring efficiency. The efficiency of the motor is dependent upon the value of the ring seal. Some of the factors of the motor efficiency, likewise dependent upon the ring sealing value, are the power output, the gasoline consumption, the oil consumption and the oil dilution. In accordance with the invention means are provided for simultaneously measuring each of these factors of motor efficiency and for simultaneously establishing their relation to the leakage or slippage past the rings, means being provided for measuring the amount of compression and work charges which pass the rings, and means being also provided for determining the motor speed at which liquid oil is passed. It can thus be determined whether or not it is necessary to install new rings. Should such installation be necessary, each ring can be tested, by means of special gages and calibrating instruments, without placing the ring in the engine, and a ring can be selected that will overcome the defects indicated by the process. The entire process of testing the sealing properties can be conducted while the engine is running under various predetermined loads including no load and without the necessity of dismantling the engine, thus permitting a great saving of time, labor and expense, in addition to completely eliminating any need of experimental overhauling of the engine to find its faults.

This process may thus be used for appraisal of cars, for certifying their actual performance value as well as ascertaining various operating conditions.

In order to carry the invention into effect, means are provided which in the preferred form of the invention include a portable gasometer for registering the slippage past the rings, of the gas which remains uncondensed, this being preferably determined in cubic inches per minute at any motor speed or load. This gasometer is attached by a pipe to an opening in the crank case, as for example to one breather, the other openings in the crank case being plugged. The apparatus is equipped with suitable valves, an adjustable counterweight and a small U-tube to indicate and maintain the proper constant slight negative pressure below atmospheric pressure, to insure accurate readings.

A spray valve and a condensing plate are utilized to determine at what motor speed liquid oil is passed by the rings. A portable still is used to determine the percent of infiltration of fuel or gasoline or impurities passing by the rings and condensing into the oil into the crank case, thus measuring the dilution of the oil.

A portable flowmeter is attached to the line feeding the gasoline to the engine, thus determining the amount of gasoline consumed in pounds of fuel per horse power hour or the miles per gallon at different loads and speeds and its relation to the ring leakage.

A portable brake is provided which can be applied to the rear wheel and particularly to a counter-shaft upon which the rear wheels are driven, the brake registering the horse power which is being developed at different speeds.

A compression gage is utilized to indicate the compression and the working pressure. A U-tube gage with a diaphragm establishes the muffler condition and back pressure. By comparing motor performance as shown by the above apparatus, when equipped with rings of varying characteristics and sealing power, it is practicable to determine within reasonable limits what ring characteristics are most desirable for any particular motor model, and also establish a standard of what performance should reasonably be expected by the owner.

With the above and other objects in view, my invention consists in the parts, improvements and combinations more fully pointed out hereinafter.

Referring now to the drawings which illustrate the process of testing for ring sealing value, as well as the apparatus employed in carrying out the process.

Fig. 1 is an elevation showing the car on the stand with the supporting pulleys for the rear wheels, and the apparatus in position for making the tests.

Fig. 2, illustrates a vertical section of the gasometer used to receive and measure the leakage mixture which has passed by the piston rings into the crank case and then to the gasometer.

Fig. 3, illustrates, in elevation, a form of still used for measuring the dilution of the oil in the crank case, and, Fig. 4, shows the spray valve and condensing plate for determining oil slippage.

Referring now to the drawings, the automobile 1, is run up on tracks 2, a hook 3 and turnbuckles 4, locking the auto to the stand and preventing forward or backward movement of the auto, when the engine is running. The rear wheels 5 of the car rest respectively on a pair of pulleys 6, the auto being thus supported and transmitting power to the pulleys when running. Means are provided for measuring the power transmitted to the pulleys. In the form of the invention illustrated, a dynamometer 7 is utilized including a band or rope 8 passing around a drum attached to the shaft of the pulleys, one end of the rope being connected to the beam 9, forming a link member of the dynamometer, the other end of the rope passing around pulley 10, and being secured to said pulley by clutch $10^a$ carrying pin $10^b$ and pivoted at $10^s$ to the pulley 10. By pressing handle $10^a$ to the right the rope which passes over the pulley 10 and under the pin $10^b$ is clamped tight to the pulley. A weighted arm $10^c$ carrying adjustable weight $10^d$ is secured to the pulley—thus putting tension on the rope or band. The end of the rope attached to beam 9 pulls on reducing linkage 11, $11^a$, $11^b$, link $11^b$ being connected to spring balance 12 (or other suitable gage) carried by stand $12^a$. A dashpot 13 checks the oscillations of the linkage system and of the gage and a weight 14 is used to counterbalance. The gage 12 indicates the tension of the rope or load applied to the other end of the rope and tachometer 16 shows the number of revolutions per minute of the pulleys, being driven by a flexible shaft therefrom. From the gage and the tachometer (knowing the value of weight $10^d$) the horse power can be readily calculated. By varying the tension of the rope, as by shifting the weight, different loads can be applied to the pulleys and different horse powers can be absorbed under varying loads of the engine.

Means are provided for measuring the amount of gasoline supplied to the engine while the ring leakage test is being made and while the horse power is being measured.

As illustrated, a flowmeter 18 is connected in the feed pipe 19, coming from the vacuum tank 20 of the gasoline supply, the pipe 19, feeding the gasoline to the carburetor on its way to the engine. By means of the flowmeter the amount of gasoline in gallons or pounds per unit of time, as per hour, may readily be measured, the position of the ring 22 with respect to the scale 23, in the form of instrument used, giving the reading directly.

In accordance with my invention, I collect the portion of the gas or mixture leaking by the rings, while the rings are in position on the piston within the cylinder of the engine and while the engine is running under different loads, and I simultaneously measure the volume of the leakage mixture, the flow of fuel, such as gasoline to the engine the exhaust pressure, the exhaust gas contents, and the horse power developed by the engine, doing this without taking the engine from the car.

The slippage past the rings of either the compressed charge, during the compression stroke or the products of the explosion during the explosion stroke, is a gaseous mixture, this term including a vapor. Some of this mixture slips past during the compression stroke and consists largely of vaporized fuel, i. e. gasoline, etc. Some of this compression charge goes past the rings into the crank case and is condensed and thereupon dilutes the oil. This dilution is measured by the still shown in Figure 3 as will be explained hereinafter. Some of the uncondensed gasoline vapor passes into the crank pit above the oil. During the firing or explosion stroke other mixtures pass by the rings. The firing stroke produces or its fuel mixture contains, among other products, water vapor, carbon monoxide, carbon dioxide, sulphur acids and other products of partial combustion, the tail ends of the fuel, etc.

I have discovered, that despite the churning of the air, gases and oils in the crank chamber of the engine by the cranks and connecting rods of the different engine cylinders, and despite the alternate compression and expansion impulses given by the various cylinder pistons to the gaseous contents of the crank chamber, and although the discharge of the leakage mixture past the piston rings occurs at only a slight pressure, and although the leakage occurs intermittently in somewhat puff fashion, part of it taking place during the compression stroke and another part during the firing stroke, nevertheless I am able to collect substantially all the gaseous mixture leaking by the piston rings while the engine is running under load and to measure the amount so passing in a given or definite interval of time. I accomplish this by collecting the gaseous leakage mixture outside of the crank chamber and then measuring its amount.

The leakage mixture passes from the crank chamber into the pipe 25 on its way to a three-way valve 26, which may be turned to either discharge the mixture into the gasometer tank or to connect the gasometer tank with the atmosphere as at 27. When passing into the gasometer, the valve 26 is set so that the pipe 25 communicates with its end 28 which is preferably U-shaped so as to communicate with the space under the gasometer bell 29, and above the water level in the gasometer tank 30. In the best embodiment of the invention, the pressure at which the leakage mixture is discharged into the bell is slightly below atmospheric and is indicated by the U-tube 31, whose legs are filled with liquid and connected with pipe 28 by branch pipe 32. This negative pressure may differ from that of the atmosphere by a slight amount. To accomplish this, the bell is biased or slightly overbalanced so as to rise slowly, when the bell is open or connected to atmosphere so as not to create a compression under the bell and a resulting back pressure in the supply pipe 28. The mixture thus enters the gasometer at substantially constant pressure, that of the atmosphere or a trifle below it. Means are also provided to compensate for the loss of buoyancy of the bell as it rises in the liquid of the tank. The bell is attached to a flexible connector or cord 33, which is attached to disc 34. A shaft 35 connects disc 34 with pulley 36, a weight 37 is attached by cord 38 to pulley 36, the weight being slightly greater than that of the buoyant effect of the bell so as to give the bell a tendency to rise. The disc 34 is made of variable radius so that the force of the weight 37 in raising the bell is varied, the force increasing in effect as the bell rises, or the pulley 36 may be given the proper variable radius. As the bell rises, the counter-balance and disc compensate for the loss of upward buoyant effect, due to the fact that more and more of the skirt of the bell leaves the liquid. In this way, a steady, slight, uniform upward force is exerted on the bell causing it to rise slowly when connected to the crank case of the stationary engine. If, however, the engine is running and the leakage mixture enters, the bell will rise more rapidly, the rate being indicated by scale 39 and a pointer 40 (or by scale on disc 34 and a pointer) and a time piece. While the bell is rising the U-tube 31 is read and the weight 37 is so varied that the U-tube will indicate slightly less than atmospheric pressure, i. e. the liquid in the tube remains nearly level. The leakage mixture is thus entering the bell at substantially atmospheric pressure.

The three-way valve may first be turned to shut off the bell, thus testing the gasometer for leaks. The three-way valve is then turned to connect the bell with the atmosphere and the time of travel of the bell is taken several times to get an average. It may take about ninety seconds to travel six inches, as shown by the scale. Then the valve is turned so as to connect the engine which is under substantially no load, or when idling, (the predetermined load being then substantially no load), with the gasometer bell and the rise of the bell is timed. This may take eight or nine minutes to travel the same distance because we now have the engine back of the bell and the gasometer is drawing its supply thru the crank pit. This second step measures the total leakage of the engine when the engine is under substantially no load, as when idling. The engine is thereupon run at different speeds and loads and the leakage is collected and measured. The difference is ascertained between the leakage when the engine is standing still and when the engine is running. This gives ring leakage at various speeds and loads with the ring under pressure due to compression and explosion. With the engine running the gasometer may rise for example in four minutes, or in a few seconds, thru the same distance as before.

The temperature of the mixture entering the gasometer and the barometric pressure are also read and the amount of the volume of the mixture is recalculated to reduce it to standard pressures and temperatures.

After reconditioning the engine and putting in new rings the gasometer is connected to the running engine again and the reduction in leakage noted. A standard is obtained for leak tight rings under different loads. In this way the efficiency of the rings may readily be determined.

When the test for leakage with the gasometer is made, the amount of oil in the crank pit and its percentage of dilution with gasoline or fuel mixture is measured and corresponding measurements are made at intervals during the test. A rate of dilution is determined by establishing a ratio between the ring tightness and oil dilution. The means for accomplishing this may be varied. In the best embodiment of the invention a still is used, a sample of oil mixture being taken from the crank pit and placed in a flask 45 (heat insulated at 45ª), heated by Bunsen burner 46. The distillates pass thru a condensing chamber 47, cooled by water jacket 48, the condensation dropping into beaker 49. The oil lubricant may thus be analyzed for rate of dilution and for percentage of dilution. The still and the gasometer have shown that dilution is caused almost entirely by the condensation of vapor slippage which has passed the rings and that it can be reduced to a negligible amount by proper ring installation. The amount of condensation will depend on the degree of saturation of the vapor leaking past the rings and its volume and temperature. The volume is measured by the gasometer.

Means are provided for determining the speed of the piston or engine at which oil passes the piston rings. There is a standard speed at which no oil should be passed and if oil passes at that speed it follows that the condition of the ring seal is imperfect. At different speeds, the oil vapor may spray out from the top of the engine cylinder 50, thru a valve 51 against a condensing plate 52 which condenses it and the speed is noted at which the oil begins to spray.

A suitable pressure indicating gage 53 giving instantaneous pressure readings may be attached to the compression end of the engine cylinder so as to establish the compression and working pressure. If the correct maximum pressure has not been obtained its cause may be ascertained by noting the readings of the apparatus and the volume of leakage into the gasometer and the relation between the loss of compression and the leakage can thus be established.

Means are provided for indicating the back pressure at the exhaust and the muffler condition. The U-tube gage 54 may be used for the purpose. One scale 55 serves when the U-tube is open, the other scale 56 if the far end be closed by a stopper—it then acting as a compression gage. A box containing diaphragm 57, the latter perforated at 58, is located between the pipe 59 and the U-tube. Pipe 59 connects into the exhaust pipe 60 between muffler 61 and the exhaust of the engine. Exhaust pressure thus reaches the box by pipe 59 entering it at one side of the diaphragm and passing thru perforation 58 to the other side of the diaphragm to supply pressure to the U-tube. At the water side (the U-tube containing water) there is a non-fluctuating pressure. At the engine side the exhaust supplies a fluctuating pressure against the diaphragm. The small leakage thru the hole in the diaphragm gives a steady pressure upon the water in the U-tube. The diaphragm does not respond synchronously to the exhaust impulses. The diaphragm takes care of surges from the exhaust and the perforation in it admits gas to the U-tube.

Means are also provided for measuring the degree of combustion of the working charge. The exhaust is connected to a reservoir for accumulating a given quantity of products of combustion at a known pressure and temperature, and then analyzing the gaseous products for carbon dioxide and other ingredients. This accumulation and analysis is made for various loads and speeds of the engine. This makes it possible to secure the most economical adjustment of the carburetor or fuel supply means.

Having thus described the process and the construction of the apparatus, its operation will be clear. It will be understood that changes may be made in the process or in the variation of the order of the steps taken and changes may be made in the apparatus without departing from the principle of the invention.

What I claim and desire to secure by Letters Patent is:

1. The process of testing the sealing properties of piston rings for an internal combustion engine, which consists in subjecting the ring while in action to the compression and explosive forces, collecting the portion of the gaseous mixture leaking by the rings in a definite interval of time and measuring the amount of mixture so collected.

2. The process of testing the sealing properties of piston rings for an internal combustion engine, while in the engine, which consists in running the engine under load, subjecting the rings while in position on the piston within the cylinder of the engine, to the pressures arising from the compression and explosion of the charge, collecting in a definite interval of time, the amount of gas, which remains uncondensed, leaking by the rings, measuring its volume and simultaneously measuring the horse power developed by the engine while under load.

3. The process of testing the sealing properties of piston rings for an internal combustion engine, which consists in running the engine under load, subjecting the rings while in position on the piston within the cylinder of the engine to the effect of compression and explosion, collecting in a definite interval of time, the amount of gas leaking by the rings, which remains uncondensed, measuring its volume and simultaneously measuring the amount of gasoline fed to the engine.

4. The process of testing the sealing properties of piston rings for an internal combustion engine, which consist in subjecting the rings while in position on the piston within the cylinder of the engine, to different explosive pressures, collecting in a definite interval of time the amount of gas, which remains uncondensed, leaking by the rings, measuring its volume, simultaneously measuring the flow of gasoline to the engine and also measuring the percentage of oil dilution.

5. The process of testing the sealing properties of piston rings for an internal combustion engine, which consists in subjecting the ring, while the ring piston is in action, under a predetermined load, to the compression and explosive forces, collecting under substantially constant pressure the portion of the gas leaking by the rings in a definite interval of time and measuring the amount of gas so collected.

6. The process of testing the sealing properties of piston rings for an internal combustion engine, which consists in subjecting the ring, while the ring piston is in action, under a predetermined load, to the compression and explosive forces, collecting under substantially constant and negative pressure, substantially that of the atmosphere, a portion of the gas leaking by the rings in a definite interval of time, and measuring the amount of gas so collected.

7. The process of testing the sealing properties of piston rings for an internal combustion engine, which consists in subjecting the ring, while the ring piston is in action, under a predetermined load, to the compression and explosive forces, permitting the portion of the gas leaking by the ring to enter the crank case of the engine, collecting in a definite interval of time, the leakage, which remains uncondensed, outside the crank case and measuring the amount of gas so collected.

8. The process of testing the sealing properties of piston rings for an internal combustion engine, while in the engine, which consists in running the engine under load, subjecting the ring to pressure while in position on the piston within the cylinder of the engine, collecting a portion of the gas leaking by the ring in a definite interval of time and measuring the amount of gas so collected.

9. The process of testing the sealing properties of piston rings for an internal combustion engine, while in the engine, which consists in running the engine under load, subjecting the ring to pressure while in position on the piston within the cylinder of the engine, collecting, outside of the engine, a portion of the amount of gas leaking by the ring in a definite interval of time and measuring the amount of gas so collected.

10. The process of testing the sealing properties of a piston ring for an internal combustion engine, which consists in subjecting the ring to pressure while in position on the piston within the cylinder of the engine, and the piston is subjected to a predetermined load, permitting leakage to take place past the ring and determining the amount of gas leaking by the ring in a definite interval of time.

11. The process of testing the sealing properties of piston rings for an internal combustion engine, while in the engine and while the engine is under a predetermined load, which consists in collecting outside the engine, in a definite interval of time, the portion of the gas leaking by the ring, which remains uncondensed and determining the amount of dilution of the oil in the crank case.

12. The process of testing the sealing properties of piston rings for an internal combustion engine, while in the engine, which consists in determining the amount of leakage in a definite interval of time past the ring while the engine is under substantially no load and then determining the amount of leakage while the engine is running under load.

13. An apparatus for testing piston rings while in position in an internal combustion engine the engine having a crank case comprising a gasometer outside of the crank case for measuring the slippage of the charge past the piston and rings and a three-way valve for connecting said gasometer to the crank case of the engine or to atmosphere as desired.

14. An apparatus for testing the sealing properties of piston rings while in the engine comprising a gasometer connected to the crank case of the engine and a pressure gage connected to the working chamber of the engine cylinder, so as to determine the relation between loss of compression and the leakage into the gasometer.

15. An apparatus for testing the sealing properties of piston rings while in the engine comprising a gasometer connected to the crank case of the engine, means for determining the leakage into the gasometer and means for indicating the back pressure at the exhaust.

16. An apparatus for testing piston rings for sealing value, while in position in the engine comprising means connected with the engine for determining the amount of the slippage of the compression and working charges past the piston and rings while the engine is running.

17. An apparatus for testing piston rings comprising means for subjecting the rings to various pressures in the engine cylinder while the engine is running and means for measuring the slippage of the charge past the pistons and rings.

18. An apparatus for testing piston rings while in position in the engine, comprising means for measuring the slippage of the charge past the pistons and rings and means for connecting said means to the crank case of the engine.

19. An apparatus for testing piston rings while in position in the engine, said engine having a crank case comprising a gasometer for measuring the slippage of the charge past the piston and rings and means for connecting said gasometer to the crank case of the engine.

20. An apparatus for testing piston rings comprising a gasometer for measuring the slippage of the charge past the piston and rings, means for connecting said gasometer to the crank case of the engine, said gasometer provided with a bell, and means for overbalancing said bell so as to cause it to rise.

21. An apparatus for testing piston rings comprising a gasometer for measuring the slippage of the charge past the piston and rings, means for connecting said gasometer to the crank case of the engine, said gasometer provided with a bell, means for overbalancing said bell so as to cause it to rise, and means for compensating for loss of buoyancy of the bell as it rises.

22. An apparatus for testing piston rings comprising a gasometer for measuring the slippage of the charge past the piston and rings, means for connecting said gasometer to the crank case of the engine, said gasometer provided with a bell, means for overbalancing said bell so as to cause it to rise, means for compensating for loss of buoyancy of the bell as it rises, and means for supplying the leakage mixture to the bell at substantially constant negative presure.

23. An apparatus for testing piston rings comprising a gasometer for measuring the slippage of the charge past the piston and rings, means for connecting said gasometer to the crank case of the engine, said gasometer provided with a bell, means for overbalancing the bell so as to cause it to rise, means for compensating for loss of buoyancy of the bell as it rises, and means for supplying the leakage mixture to the bell at substantially constant atmospheric pressure.

24. An apparatus for testing piston rings comprising a gasometer for measuring the slippage of the charge past the piston and rings, means for connecting said gasometer to the crank case of the engine, said gasometer provided with a bell, and means for overbalancing said bell so as to cause it to rise, said means including a disc of variable radius to compensate for loss of buoyancy of the bell as it rises.

In testimony whereof, I have signed my name to this specification.

ROBERT B. WASSON.